(12) United States Patent
Yao

(10) Patent No.: US 7,538,984 B2
(45) Date of Patent: May 26, 2009

(54) ROTATIONAL PZT MICRO-ACTUATOR WITH A ROTATABLE PLATE

(75) Inventor: MingGao Yao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 489 days.

(21) Appl. No.: 11/304,544

(22) Filed: Dec. 16, 2005

(65) Prior Publication Data

US 2007/0139824 A1 Jun. 21, 2007

(51) Int. Cl.
G11B 5/56 (2006.01)
(52) U.S. Cl. .................. 360/294.4; 360/294.6
(58) Field of Classification Search .............. 360/294.4, 360/294.6
See application file for complete search history.

(56) References Cited

U.S. PATENT DOCUMENTS

| | | | |
|---|---|---|---|
| 5,299,081 | A | 3/1994 | Hatch et al. |
| 5,611,707 | A | 3/1997 | Meynier |
| 5,636,089 | A | 6/1997 | Jurgenson et al. |
| 5,898,544 | A | 4/1999 | Krinke et al. |
| 6,198,606 | B1 | 3/2001 | Boutaghou et al. |
| 6,320,730 | B1 * | 11/2001 | Stefansky et al. ........ 360/294.4 |
| 6,515,834 | B1 * | 2/2003 | Murphy ................. 360/294.4 |
| 6,538,836 | B1 | 3/2003 | Dunfield et al. |
| 6,617,763 | B2 | 9/2003 | Mita et al. |
| 6,624,984 | B2 | 9/2003 | Lewis et al. |
| 6,671,131 | B2 | 12/2003 | Kasajima et al. |
| 6,700,727 | B1 | 3/2004 | Crane et al. |
| 6,700,749 | B2 | 3/2004 | Shiraishi et al. |
| 6,943,990 | B1 * | 9/2005 | Yokoyama et al. ....... 360/294.4 |
| 6,950,266 | B1 | 9/2005 | McCaslin et al. |
| 2003/0147177 | A1 | 8/2003 | Yao et al. |
| 2003/0147181 | A1 | 8/2003 | Shiraishi et al. |
| 2003/0168935 | A1 | 9/2003 | Ogawa et al. |
| 2004/0125510 | A1 * | 7/2004 | Yang et al. ............. 360/294.4 |
| 2006/0023338 | A1 | 2/2006 | Sharma et al. |
| 2006/0044699 | A1 * | 3/2006 | Hirano et al. ........... 360/294.4 |
| 2006/0050442 | A1 | 3/2006 | Yao et al. |
| 2006/0072247 | A1 | 4/2006 | Yao et al. |
| 2006/0077594 | A1 * | 4/2006 | White et al. ............. 360/294.4 |
| 2006/0082917 | A1 | 4/2006 | Yao et al. |

(Continued)

FOREIGN PATENT DOCUMENTS

JP 2002-74871 3/2002

(Continued)

OTHER PUBLICATIONS

U.S. Appl. No. 11/238,998, filed Sep. 2005, Yang et al.

(Continued)

Primary Examiner—A. J. Heinz
(74) Attorney, Agent, or Firm—Nixon & Vanderhye P.C.

(57) ABSTRACT

A micro-actuator for a head gimbal assembly includes a metal frame, PZT elements, and a rigid beam. The metal frame includes a top support adapted to support a slider of the head gimbal assembly, and a pair of side arms extending vertically from respective sides of the top support. The top support includes a rotatable plate and connection arms that couple the rotatable plate to respective side arms. A PZT element is mounted to each of the side arms. Each PZT element is excitable to cause selective movement of the side arms. The rigid beam is mounted between the side arms at an end opposite the top support.

22 Claims, 19 Drawing Sheets

U.S. PATENT DOCUMENTS

2006/0098347 A1     5/2006     Yao et al.
2006/0146449 A1     7/2006     Yao et al.

FOREIGN PATENT DOCUMENTS

JP     2002-133803     5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

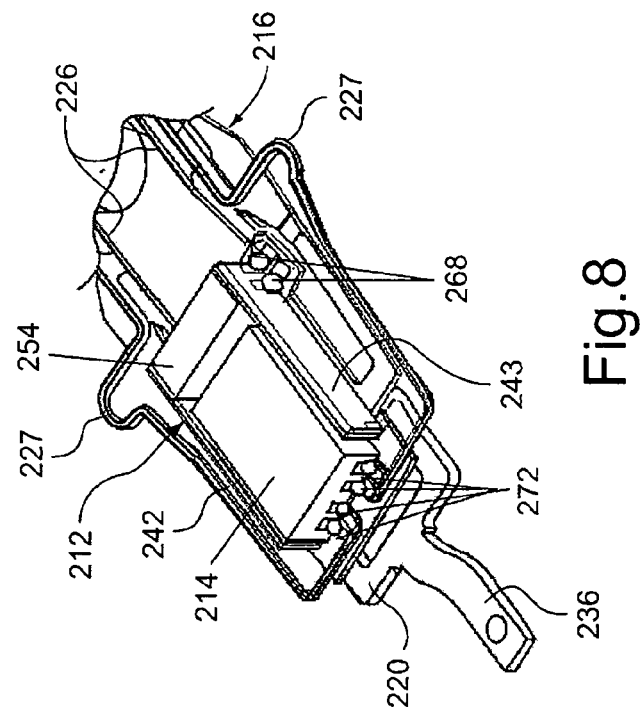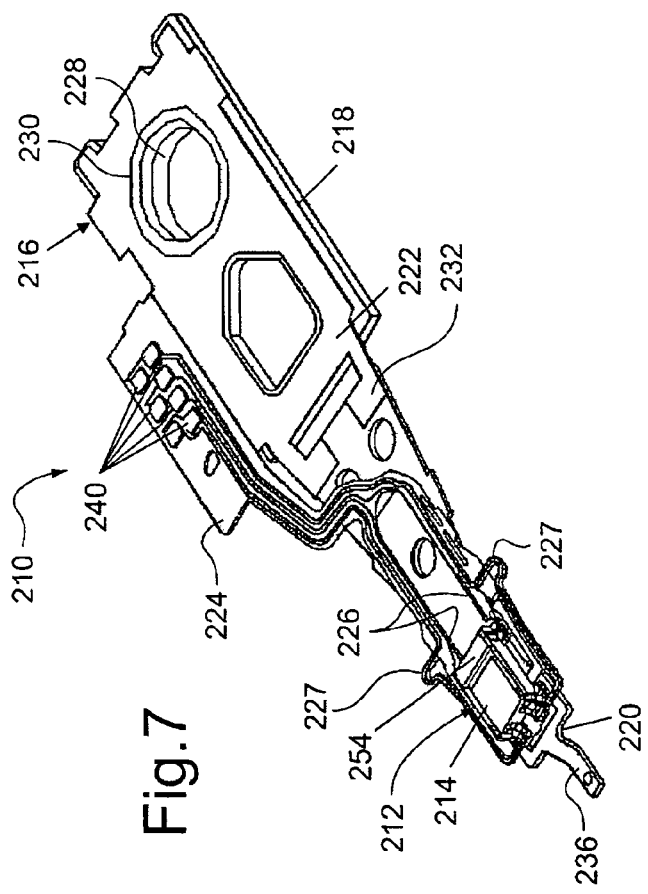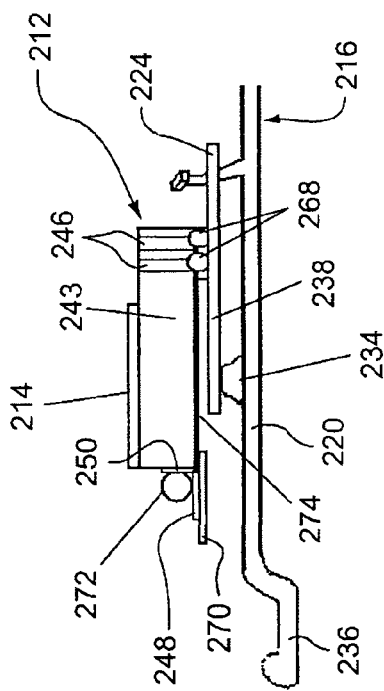

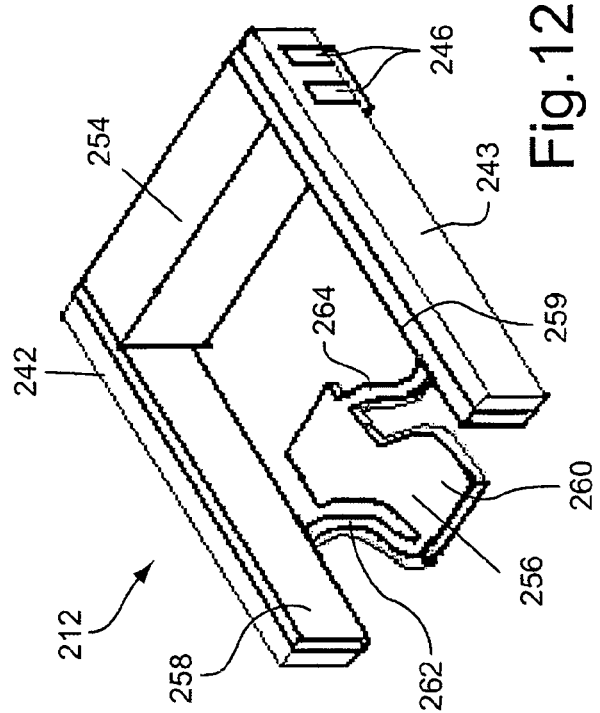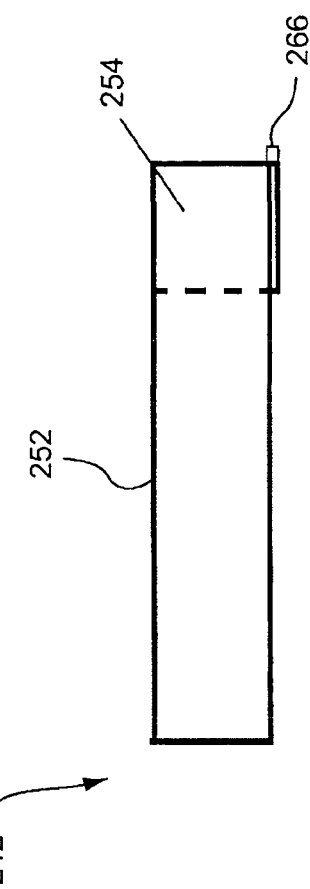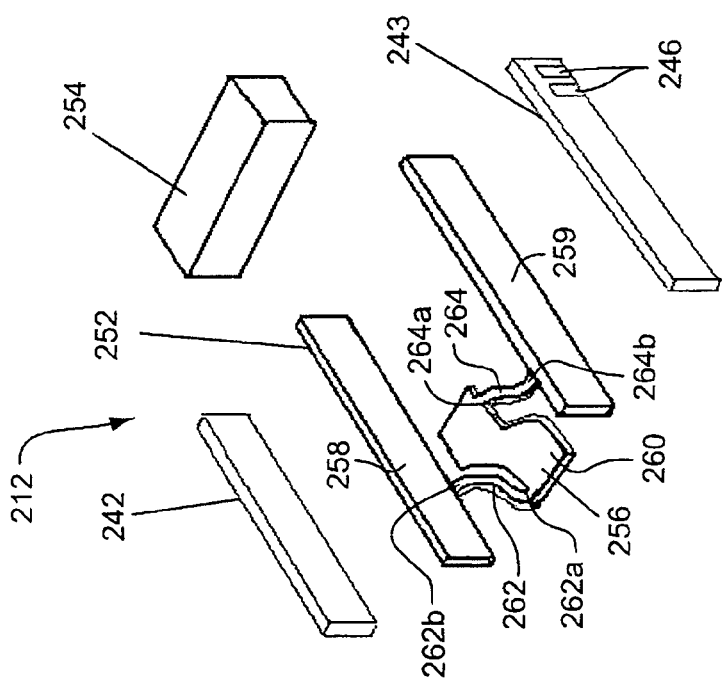

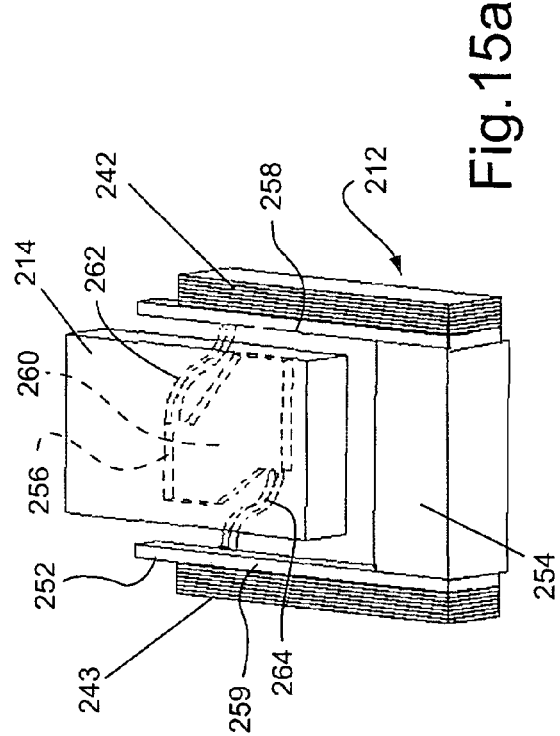
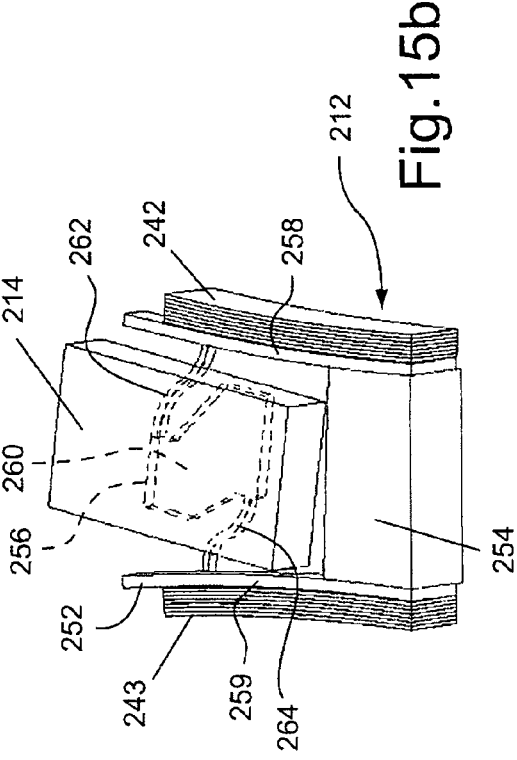
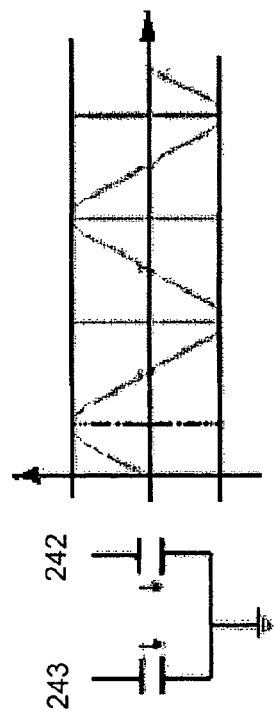
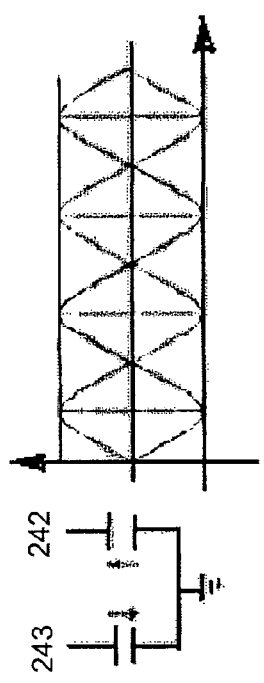

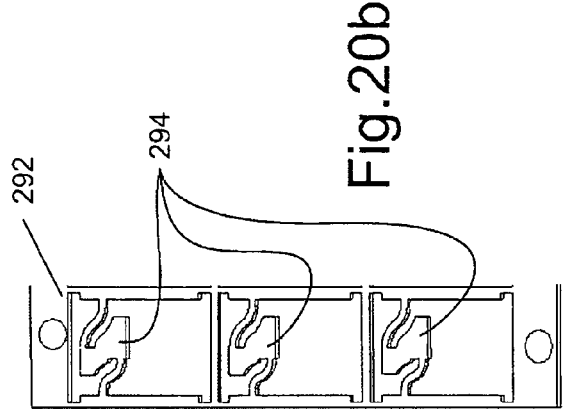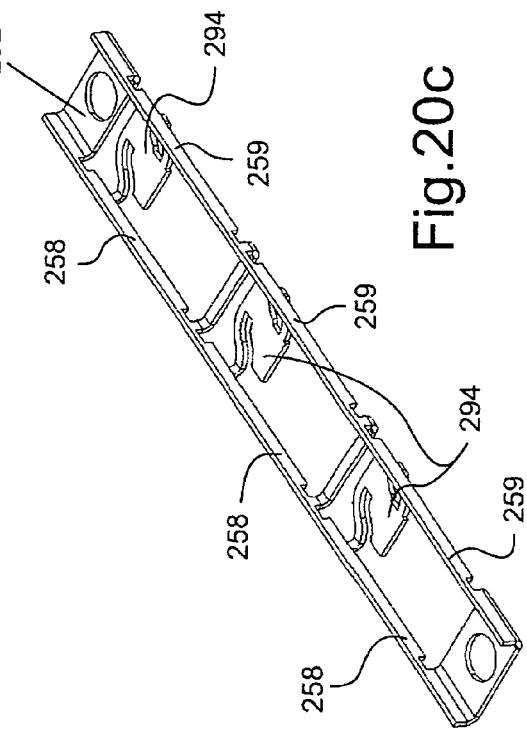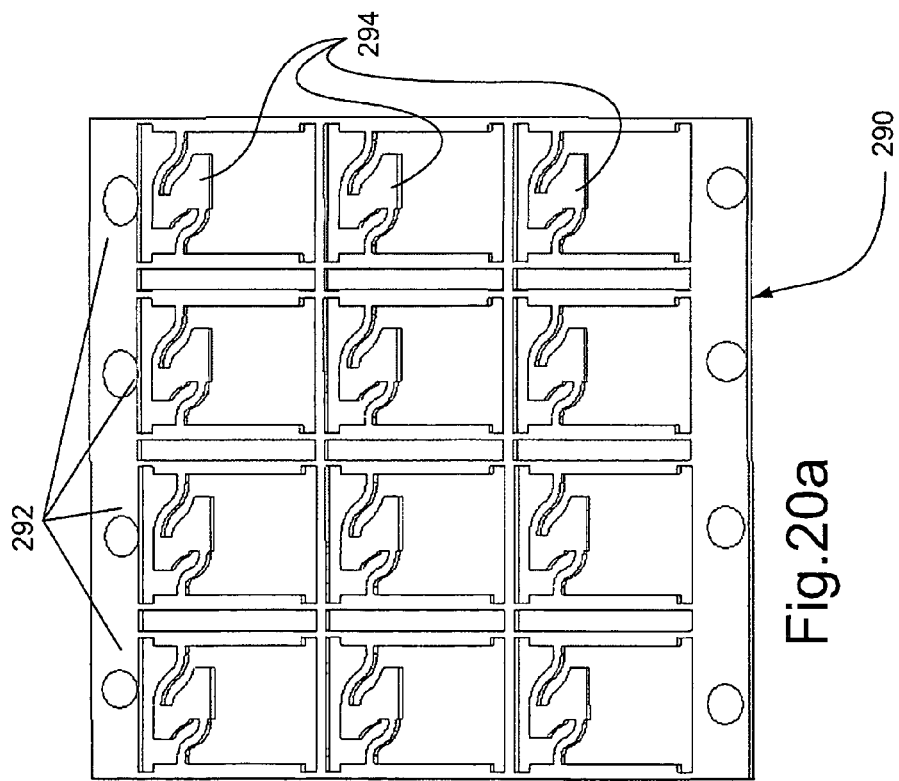

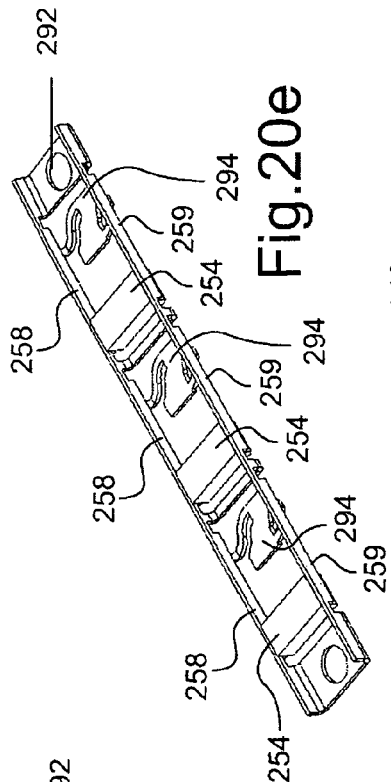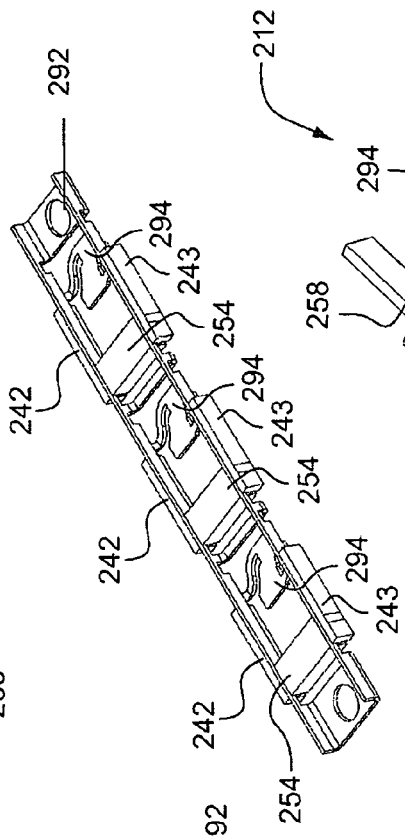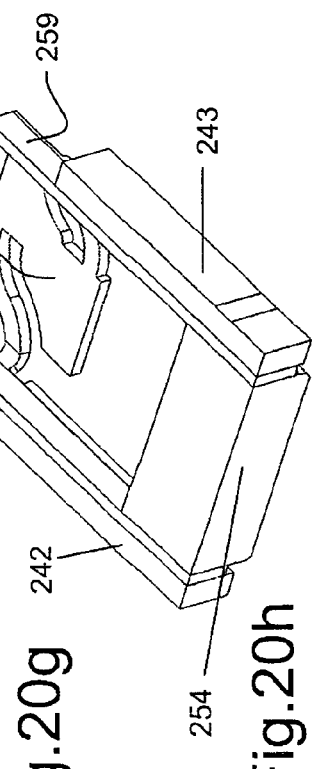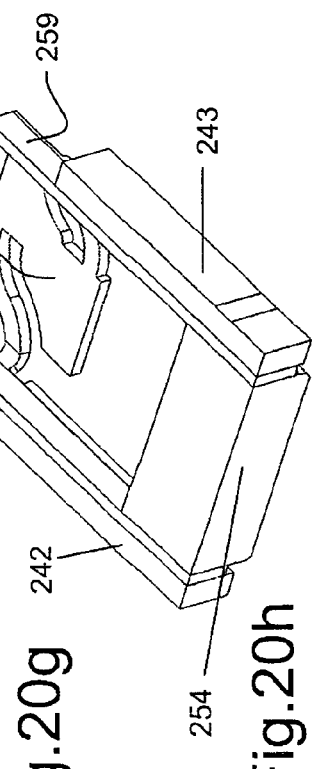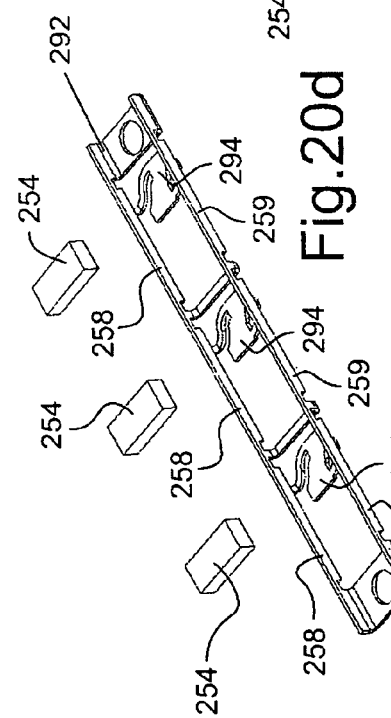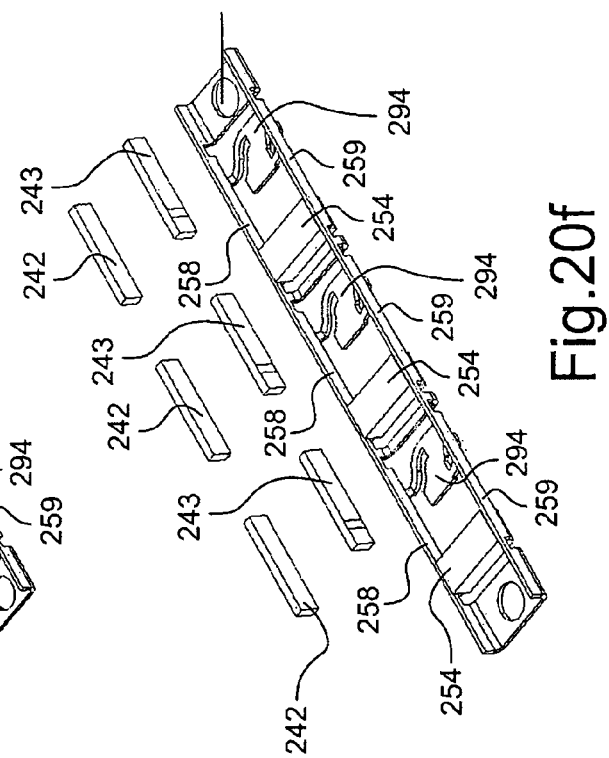

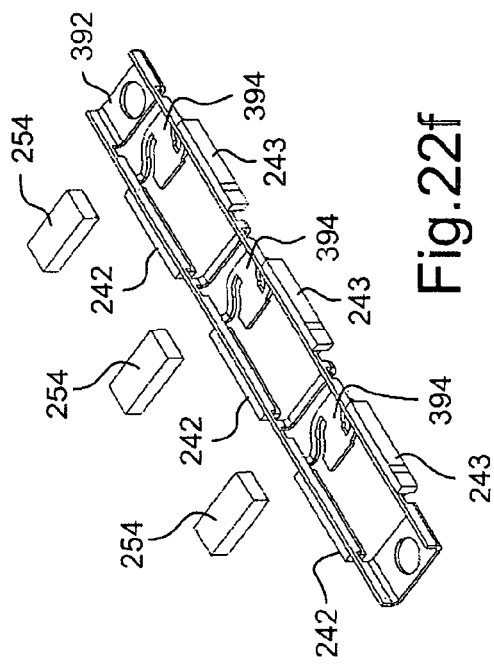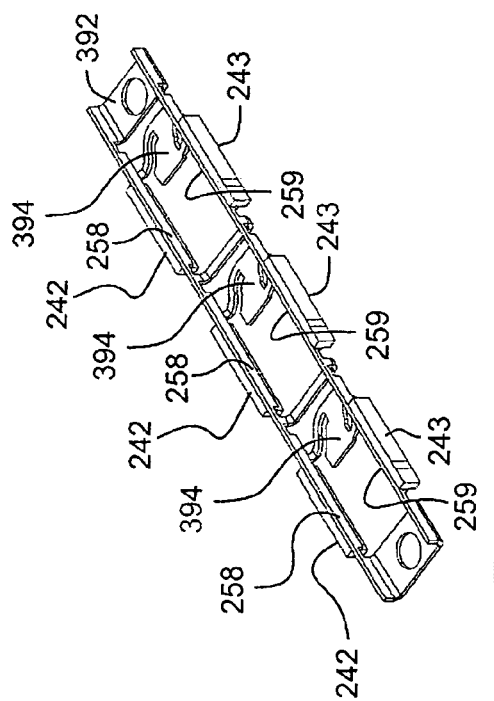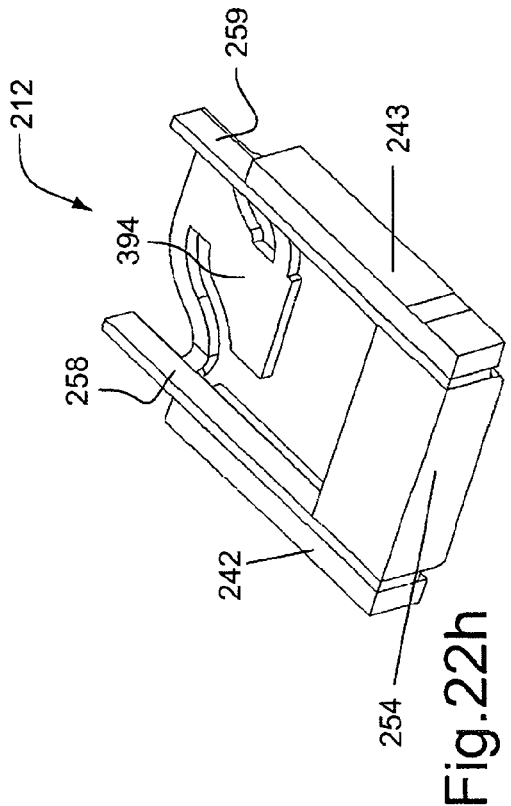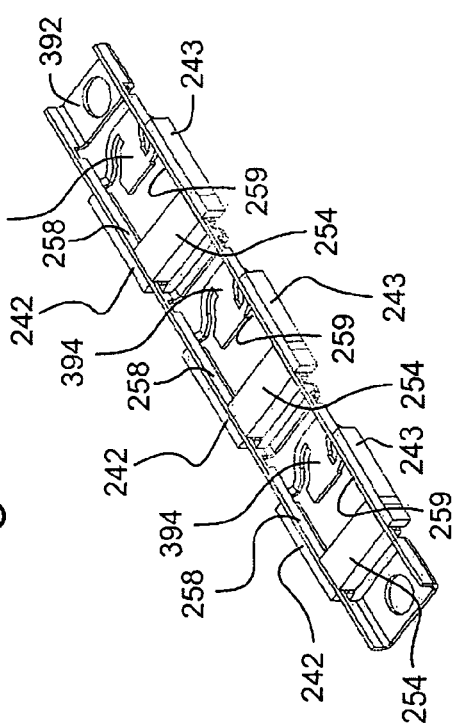

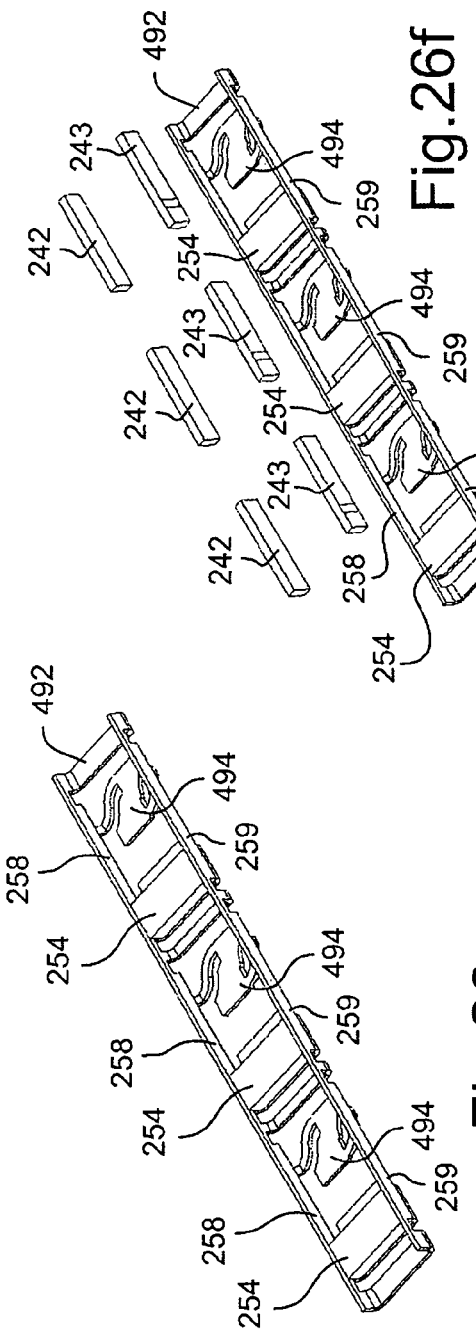
Fig.26e
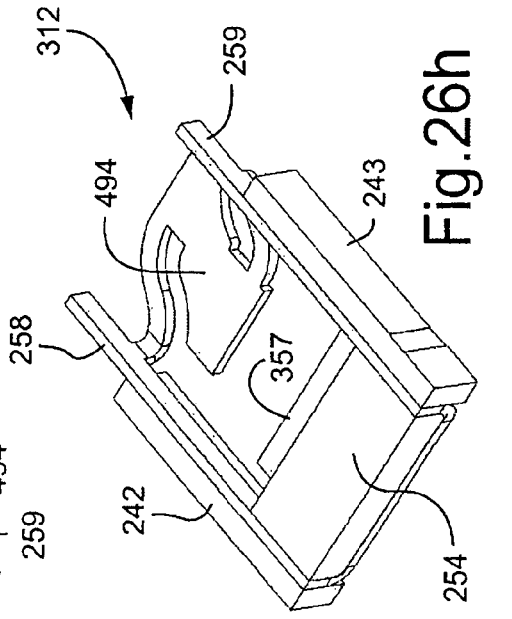
Fig.26f
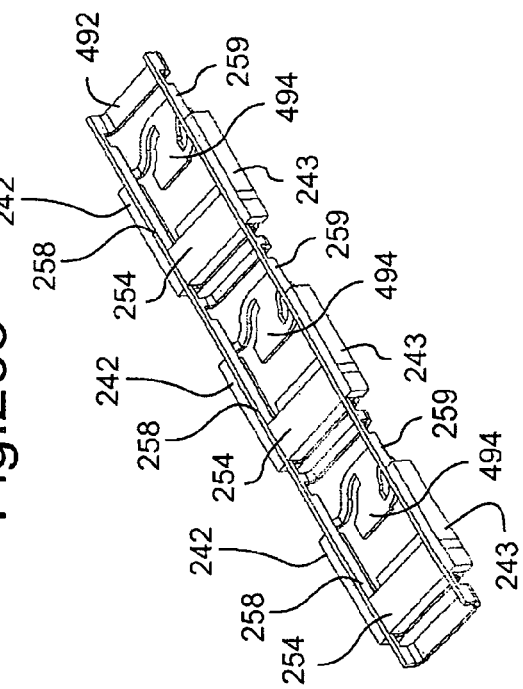
Fig.26g
Fig.26h

ROTATIONAL PZT MICRO-ACTUATOR WITH A ROTATABLE PLATE

FIELD OF THE INVENTION

The present invention relates to information recording disk drive devices and, more particularly, to a micro-actuator for a head gimbal assembly (HGA) of the disk drive device. More specifically, the present invention is directed to a micro-actuator that is structured to improve resonance performance of the HGA.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly." Other exemplary PZT micro-actuators are also disclosed in, for example, U.S. Pat. Nos. 6,671,131 and 6,700,749.

FIG. 1 illustrates a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the head gimbal assembly (HGA) 100 of the conventional disk drive device of FIG. 1 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIG. 2, the HGA 100 includes a suspension 106 having a flexure 108. The flexure 108 provides a suspension tongue 110 to load the PZT micro-actuator 105 and the slider 103. Two outwardly protruding traces 112, 114 are provided to the flexure 108 on opposite sides of the suspension tongue 110. Each of the traces 112, 114 has one end portion connected with a float plate 116 and another end portion connected with multi traces 118 that are electrically connected to bonding pads 120.

Referring to FIG. 3, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIG. 4, the PZT micro-actuator 105 is physically coupled to the suspension tongue 110 by the bottom support 134 of the frame 130. The bottom support 134 may be mounted on the suspension tongue 110 by epoxy or laser welding, for example. Three electrical connection balls 150 (gold ball bonding or solder ball bonding, GBB or SBB) are provided to couple the PZT micro-actuator 105 to the suspension traces 118 located at the side of each PZT element 140, 142. In addition, there are multi ball for example four metal balls 152 (GBB or SBB) for coupling the slider 103 to the traces 118 for electrical connection of the read/write transducers. When power is supplied through the suspension traces 118, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement of the slider 103 connected thereto, thereby making the slider 103 move on the track of the disk in order to fine tune the position of the read/write head. In this manner, controlled displacement of slider 103 can be achieved for fine positional tuning.

FIG. 5 illustrates how the PZT micro-actuator 105 works when a voltage is applied to the PZT elements 140, 142. For example, when a positive sine voltage is input to the PZT element 140 of the micro-actuator which has a positive polarization, in the first half period, the PZT element 140 will shrink and cause the side arm 136 to deform as a water waveform shape. Since the slider 103 is mounted on the top support 132, this deformation will cause the slider to move or sway towards the left side. Likewise, when a negative sine voltage is input to the PZT element 142 of the micro-actuator which has a positive polarization, in the second half period, the PZT element 142 will shrink and cause the side arm 138 to deform as a water waveform shape. This deformation will cause the slider 103 to move or sway towards the right side. Of course, this operation may depend on the electric control circle and PZT element polarization direction, but the work principle is well known.

The PZT micro-actuator 105 works in a translational or sway-like manner in which the PZT elements 140, 142 undergo intermissive contraction and extension that causes the PZT micro-actuator to deform as a water waveform shape and move the slider in a sway-like manner. This intermissive motion will generate reaction forces in the suspension tongue 110 through the bottom support 134 mounted to the suspension tongue 110. These reaction forces will generate a suspension resonance, which limits the performance characteristics of the disk drive device, especially for the servo bandwidth.

For example, FIG. 6 illustrates testing data of the resonance of a prior PZT micro-actuator design. As illustrated, when the PZT micro-actuator is operated (exciting the PZT), a suspension resonance is generated due the relatively large reaction force of the suspension. The curve 160 illustrates a resonance when the suspension base plate is shaken or excited, and the curve 170 illustrates a resonance when the PZT element of the micro-actuator is excited. As illustrated, the curves 160, 170 have similar forms.

Thus, there is a need for an improved system that does not suffer from the above-mentioned drawbacks.

SUMMARY OF THE INVENTION

One aspect of the present invention relates to a micro-actuator structured to improve resonance performance of the HGA.

Another aspect of the invention relates to a micro-actuator for a head gimbal assembly. The micro-actuator includes a metal frame including a top support adapted to support a slider of the head gimbal assembly, and a pair of side arms extending vertically from respective sides of the top support. The top support includes a rotatable plate and connection arms that couple the rotatable plate to respective side arms. A PZT element is mounted to each of the side arms. Each PZT element is excitable to cause selective movement of the side arms. A rigid beam is mounted between the side arms at an end opposite the top support.

Another aspect of the invention relates to a head gimbal assembly including a micro-actuator, a slider, and a suspension that supports the micro-actuator and the slider. The micro-actuator includes a metal frame including a top support adapted to support the slider, and a pair of side arms extending vertically from respective sides of the top support. The top support includes a rotatable plate and connection arms that couple the rotatable plate to respective side arms. A PZT element is mounted to each of the side arms. Each PZT element is excitable to cause selective movement of the side arms. A rigid beam is mounted between the side arms at an end opposite the top support.

Yet another aspect of the invention relates to a disk drive device including a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a metal frame including a top support adapted to support the slider, and a pair of side arms extending vertically from respective sides of the top support. The top support includes a rotatable plate and connection arms that couple the rotatable plate to respective side arms. A PZT element is mounted to each of the side arms. Each PZT element is excitable to cause selective movement of the side arms. A rigid beam is mounted between the side arms at an end opposite the top support.

Yet another aspect of the invention relates to a method for manufacturing a PZT micro-actuator. The method includes forming a sheet that includes multiple row bars of interconnected frame units, cutting a single row bar from the sheet, bending opposing sides of the single row bar to form side arms for each frame unit, mounting a rigid beam between the side arms of each frame unit, mounting a PZT element to the side arms of each frame unit, cutting a single frame unit from the single row bar to form a PZT micro-actuator, and inspecting the PZT micro-actuator.

Still another aspect of the invention relates to a method for manufacturing a PZT micro-actuator. The method includes forming a sheet that includes multiple row bars of interconnected frame units, cutting a single row bar from the sheet, mounting a PZT element to opposing side arms of each frame unit of the single row bar, bending opposing sides of the single row bar to form upstanding side arms for each frame unit, mounting a rigid beam between the upstanding side arms of each frame unit, cutting a single frame unit from the single row bar to form a PZT micro-actuator, and inspecting the PZT micro-actuator.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 7 is a perspective view of a head gimbal assembly (HGA) including a PZT micro-actuator according to an embodiment of the present invention;

FIG. 8 is a partial perspective of the HGA shown in FIG. 7;

FIG. 9 is a side view of the HGA shown in FIG. 8;

FIG. 11 is an exploded view of the PZT micro-actuator shown in FIG. 7 removed from the slider and HGA;

FIG. 12 is an assembled perspective view of the PZT micro-actuator shown in FIG. 11;

FIG. 13 is a side view of the PZT micro-actuator shown in FIG. 12;

FIG. 14a illustrates an embodiment of the electrical connection structure between PZT elements of the PZT micro-actuator shown in FIG. 7;

FIG. 14b illustrates a voltage applied to the PZT elements of the PZT micro-actuator shown in FIG. 7;

FIG. 15a is a top view of the slider and PZT micro-actuator of the HGA shown in FIG. 7 in a relaxed state;

FIG. 15b is a top view of the slider and PZT micro-actuator of the HGA shown in FIG. 7 when a voltage is applied;

FIG. 16a illustrates another embodiment of the electrical connection structure between PZT elements of the PZT micro-actuator shown in FIG. 7;

FIG. 16b illustrates another voltage applied to the PZT elements of the PZT micro-actuator shown in FIG. 7;

FIGS. 20a-20h are sequential views illustrating the manufacturing process shown in FIG. 19;

FIGS. 22a-22h are sequential views illustrating the manufacturing process shown in FIG. 21;

FIGS. 26a-26h are sequential views illustrating the manufacturing process shown in FIG. 25.

DETAILED DESCRIPTION OF ILLUSTRATED EMBODIMENTS

Figure 1:
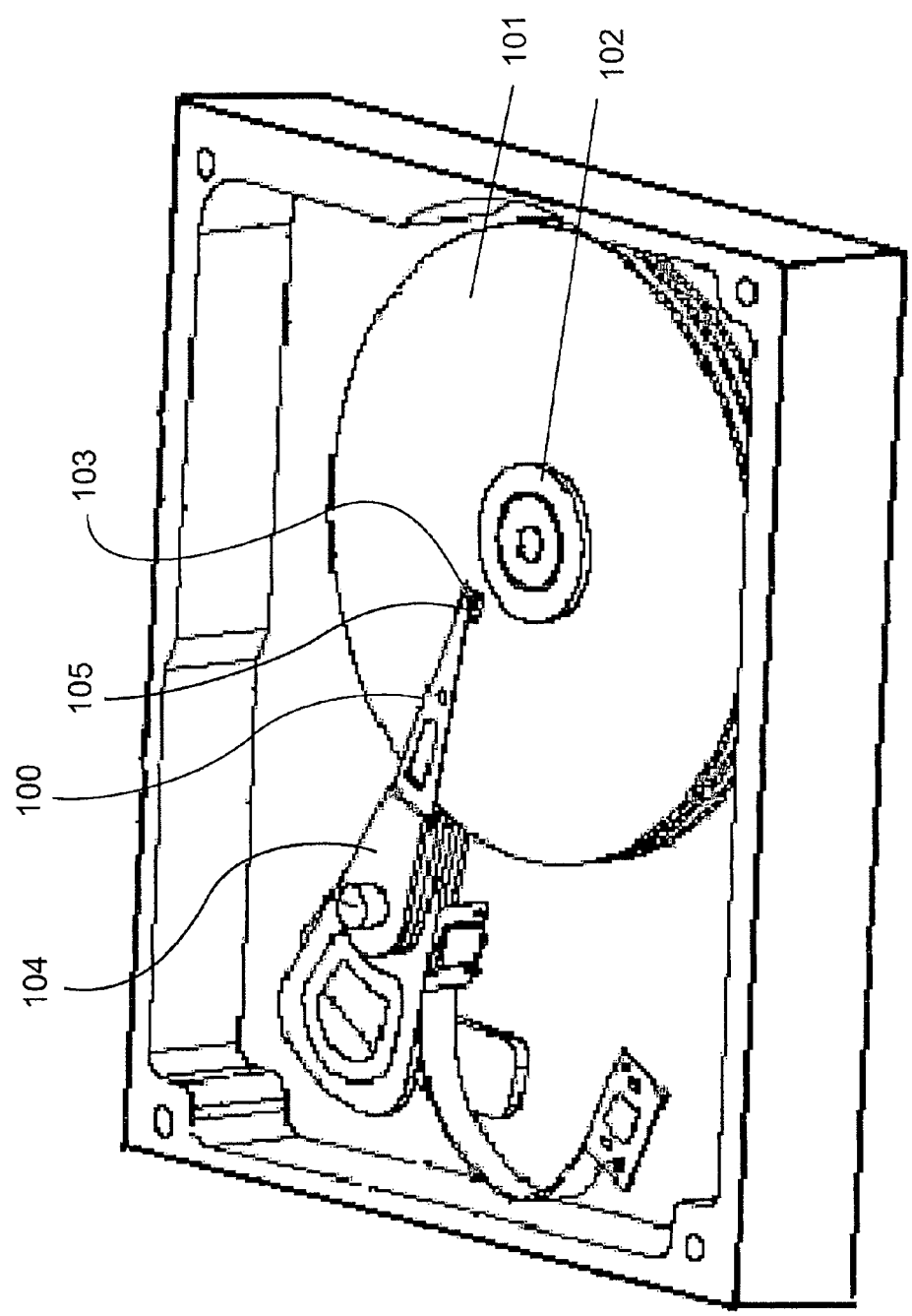
FIG. 1 is a perspective view of a conventional disk drive unit.
Figure 2:
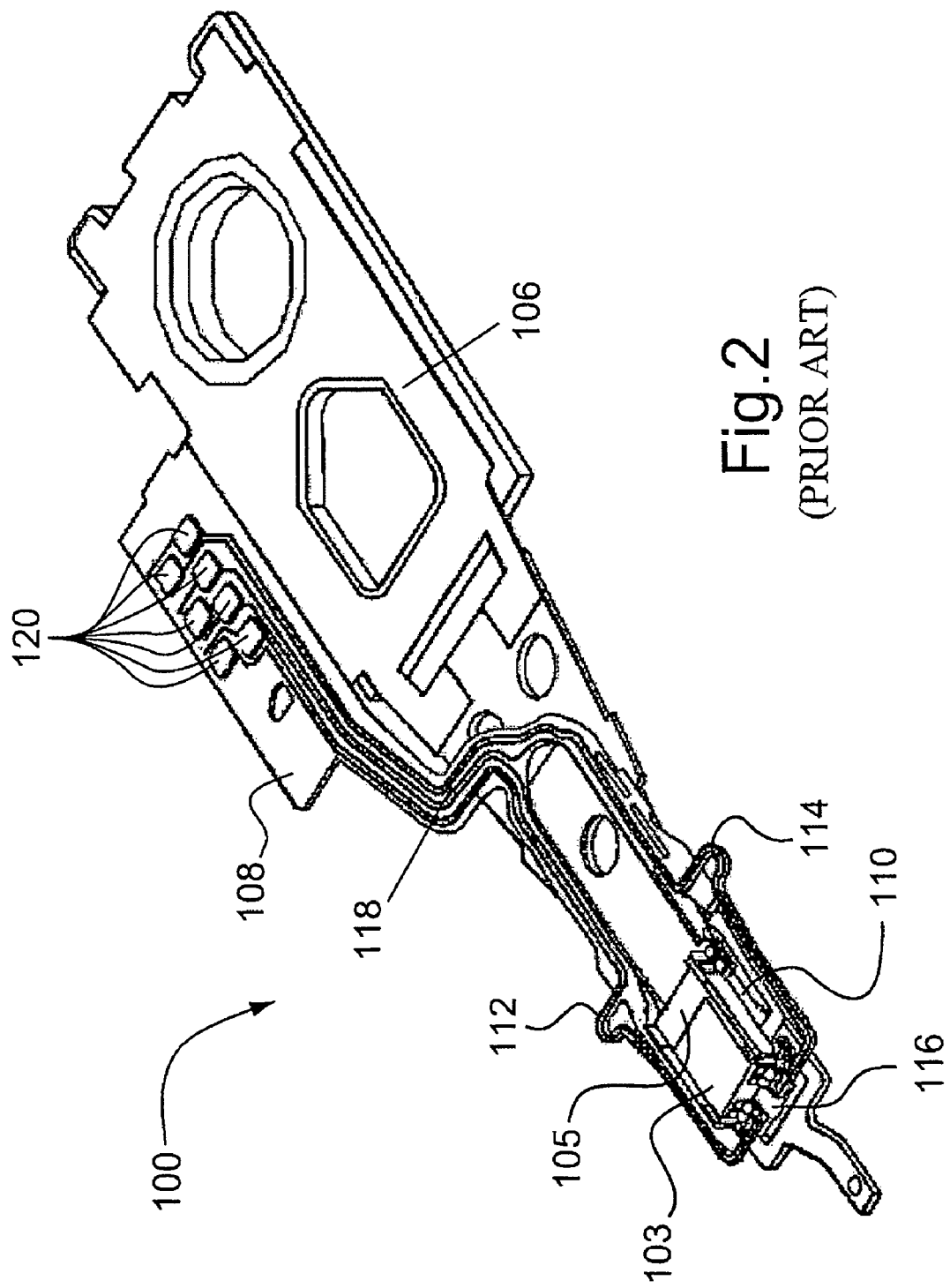
FIG. 2 is a perspective view of a conventional head gimbal assembly (HGA)
Figure 4:
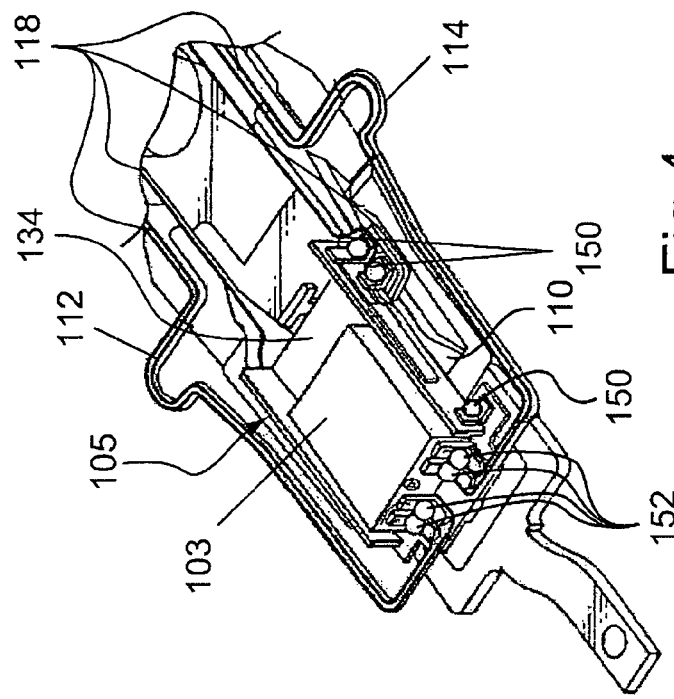
FIG. 4 is a partial perspective view of the HGA shown in FIG. 2.
Figure 3:
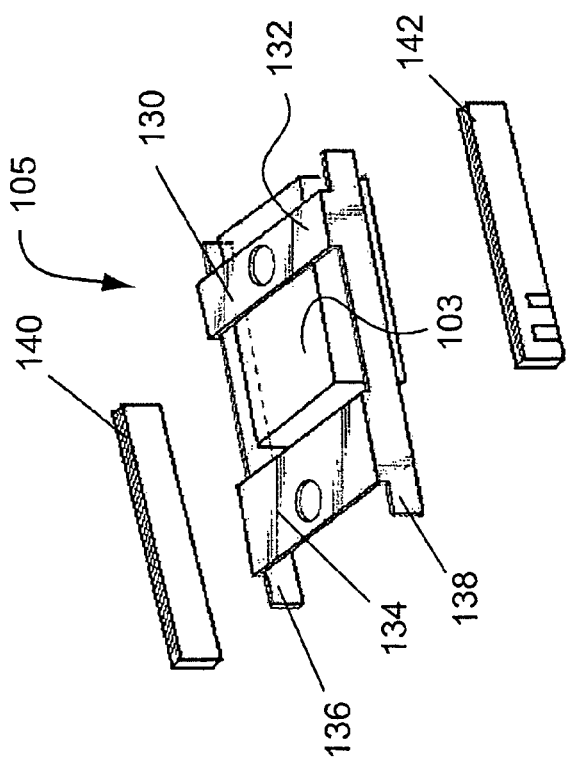
FIG. 3 is a perspective view of a slider and PZT micro-actuator of the HGA shown in FIG. 2.

Various preferred embodiments of the instant invention will now be described with reference to the figures, wherein like reference numerals designate similar parts throughout the various views. As indicated above, the instant invention is designed to improve resonance performance in a head gimbal assembly (HGA) while precisely actuating the slider using the micro-actuator. An aspect of the instant invention is to provide a rotation-type PZT micro-actuator configured to improve resonance performance in the HGA. By improving resonance performance of the HGA, the performance characteristics of the disk drive device are improved.

Several example embodiments of a micro-actuator for a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 7-13 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216 to load or suspend the PZT micro-actuator 212 and the slider 214.

As illustrated, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by welding. As illustrated, the hinge 222 includes a hole 230 that align with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging the flexure 224 (see FIG. 9). An optional lift tab 236 may be provided on the load beam 220 to lift the HGA 210 from the disk when the disk is not rotated.

The flexure 224 is mounted to the hinge 222 and the load beam 220, e.g., by lamination or welding. The flexure 224 provides a suspension tongue 238 to couple the PZT micro-actuator 212 to the suspension 216 (see FIG. 10). The suspension tongue 238 engages the dimple 234 on the load beam 220. As illustrated, the dimple 234 is located in the center of the slider 214. Also, the suspension traces 226, 227 are provided on the flexure 224 to electrically connect a plurality of connection pads 240 (which connect to an external control system) with the slider 214 and the PZT elements 242, 243 on the PZT micro-actuator 212. The suspension traces 226, 227 may be a flexible printed circuit (FPC) and may include any suitable number of lines.

Figure 10:
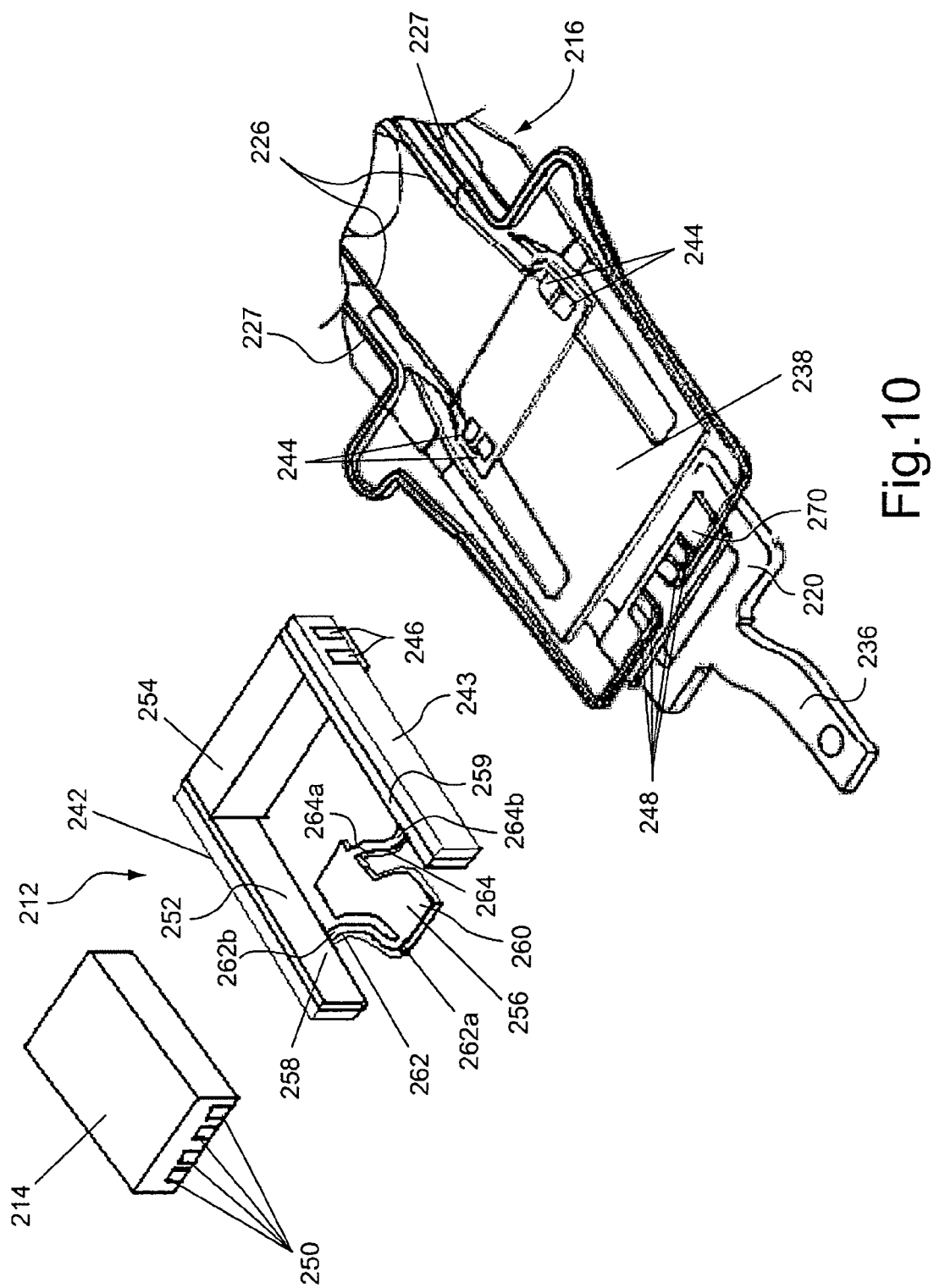
FIG. 10 is an exploded view of the HGA shown in FIG. 8.

As best shown in FIGS. 8 and 10, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

FIGS. 10-13 illustrate the PZT micro-actuator 212 removed from the slider 214 and the suspension 216. As illustrated, the PZT micro-actuator 212 includes a frame 252, PZT elements 242, 243 mounted to respective side arms of the frame 252, and a rigid beam or block 254 mounted between the side arms of the frame 252.

The frame 252 includes a top support 256 and side arms 258, 259 provided to opposing sides of the top support 256. The top support 256 includes a rotatable plate 260 and connection arms or bridges 262, 264 that couple the plate 260 to respective side arms 258, 259. The frame 252 is preferably constructed of metal, however other suitable materials are possible.

As best shown in FIGS. 10-12, the bridge 262 is curve-shaped and has opposing ends 262a, 262b, and the bridge 264 is curve-shaped has opposing ends 264a, 264b. The ends 262a and 264a are coupled with the rotatable plate 260, and the other ends 262b and 264b are coupled with respective side arms 258, 259. In the illustrated embodiment, the ends 262b and 264b are coupled with respective side arms 258, 259 in the same location in the y-axis direction, i.e., the ends 262b and 264b have the same distance between the coupling point to the end of the respective side arm 258, 259. Also, the ends 262a and 264a are coupled with the rotatable plate 260 in mirror relation to a center of the rotatable plate 260. That is, the coupling points of the ends 262a and 264a are symmetrically located with respect to the center of gravity of the rotatable plate 260. This arrangement allows the rotatable plate 260 to rotate around its center of gravity when the PZT elements 242, 243 are excited in use. However, the bridges 262, 264 may have other suitable shapes and coupling arrangements.

A PZT element 242, 243 is mounted to an outwardly facing surface of a respective side arm 258, 259 of the frame 252. Bonding pads 246, e.g., two pads, are provided on the PZT elements 242, 243 for electrically connecting the PZT elements 242, 243 to the inner suspension traces 226. Each PZT element 242, 243 has a plate-like shape and may be a ceramic PZT, a thin-film PZT, PMN-PT, or other PZT material.

The rigid beam or block 254 constitutes a bottom support that is structured to connect the frame 252 to the suspension 216. The block 254 is mounted between the side arms 258, 259 of the frame 252, e.g., by welding. As illustrated, the block 254 is mounted to an end of the side arms 258, 259 opposite the top support 256. The block 254 is mounted to the side arms 258, 259 to provide a step 266 to a back side of the frame 252 (see FIG. 13). The step 266 may be in the range of 35-70 μm. The block 254 or portions thereof, e.g., end portions, may have other suitable shapes.

The block 254 is partially mounted to the suspension tongue 238 of the flexure 224, e.g., by epoxy, resin, or welding, to mount the PZT micro-actuator 212 to the suspension 216. Also, the PZT bonding pads 246, e.g., two bonding pads, provided on respective PZT elements 242, 243 are electrically connected to respective bonding pads 244 on the inner suspension traces 226 using electrical connection balls (GBB or SBB) 268. This allows power to be applied via the inner suspension traces 226 to the PZT elements 242, 243.

The top support 254 is structured to connect the frame 252 to the slider 214. Specifically, the slider 214 has bonding pads 250, e.g., four bonding pads, on an end thereof corresponding to the slider bonding pads 248 provided on a float plate 270. The top support 254 supports the slider 214 thereon and the slider bonding pads 248 are electrically bonded with respective pads 250 provided on the slider 214 using, for example, electric connection balls (GBB or SBB) 272. This connects the top support 254 to the slider 214 and electrically connects the slider 214 and its read/write elements to the outer suspension traces 227 on the suspension 216. Also, a parallel gap 274 is provided between the suspension tongue 238 and the PZT micro-actuator 212 to allow the PZT micro-actuator 212 to move freely in use, as shown in FIG. 9. The parallel gap 274 is provided by the step 266 formed by the block 254 in the back side of the frame 252.

In the illustrated embodiment, the slider 214 is mounted to the rotatable plate 260 of the top support 256 such that the center of gravity of the slider 214 will substantially match the center of gravity of the rotatable plate 260. Also, the block 254 of the PZT micro-actuator 212 is mounted on the suspension tongue 238 such that the center of gravity of the rotatable plate 260 substantially matches with the dimple 234 of the suspension 216. This arrangement allows the slider 214 and the rotatable plate 260 to rotate around the center of suspension dimple 234 when the rotatable plate 260 is rotated by exciting the PZT elements 242, 243. The parallel gap 274 provided by the step 266 allows the rotatable plate 260 and slider 214 to rotate smoothly in use.

FIG. 14a illustrates an embodiment of an electrical connection structure between the two PZT elements 242, 243 of the PZT micro-actuator 212, and FIG. 14b illustrates the operation voltage. As illustrated, the PZT elements 242, 243 have the same polarization direction and have a common ground. Also, a sine voltage is applied to operate the PZT elements 242, 243. FIG. 15a illustrates the PZT micro-actuator 212 in a relaxed state, and FIG. 15b illustrates the PZT micro-actuator 212 when voltage is applied. As shown in FIG. 15b, when the voltage goes to the first half period, the PZT elements 242, 243 will shrink, which will cause both side arms 258, 259 to bend towards the outside. Since the two bridges 262, 264 are coupled to the rotatable plate 260 in offset relation with respect to its center and the slider 214 is mounted on the rotatable plate 260, the slider 214 will rotate against its center towards the right side. When the voltage goes to the second half period, the PZT elements 242, 243 will return back or extend and the slider 214 will rotate towards the left side.

FIG. 16a illustrates another embodiment of an electrical connection structure between the two PZT elements 242, 243 of the PZT micro-actuator 212, and FIG. 16b illustrates the operation voltage. As illustrated, the PZT elements 242, 243 have opposite polarization directions and have a common ground. Also, two different sine voltages are applied to the PZT elements 242, 243 to operate the PZT elements 242, 243 separately. When the voltage goes to the first half period, since one of the PZT elements 242, 243 has a positive polarization direction and the other of the PZT elements 242, 243 has a negative polarization direction, the PZT elements 242, 243 will shrink, which will cause both side arms 258, 259 to bend towards the outside. Since the two bridges 262, 264 are coupled to the rotatable plate 260 in offset relation with respect to its center and the slider 214 is mounted on the rotatable plate 260, the slider 214 will rotate against its center towards the right side (e.g., see FIG. 15b). When the voltage goes to the second half period, the PZT elements 242, 243 will return back or extend and the slider 214 will rotate towards the left side.

Figure 6:
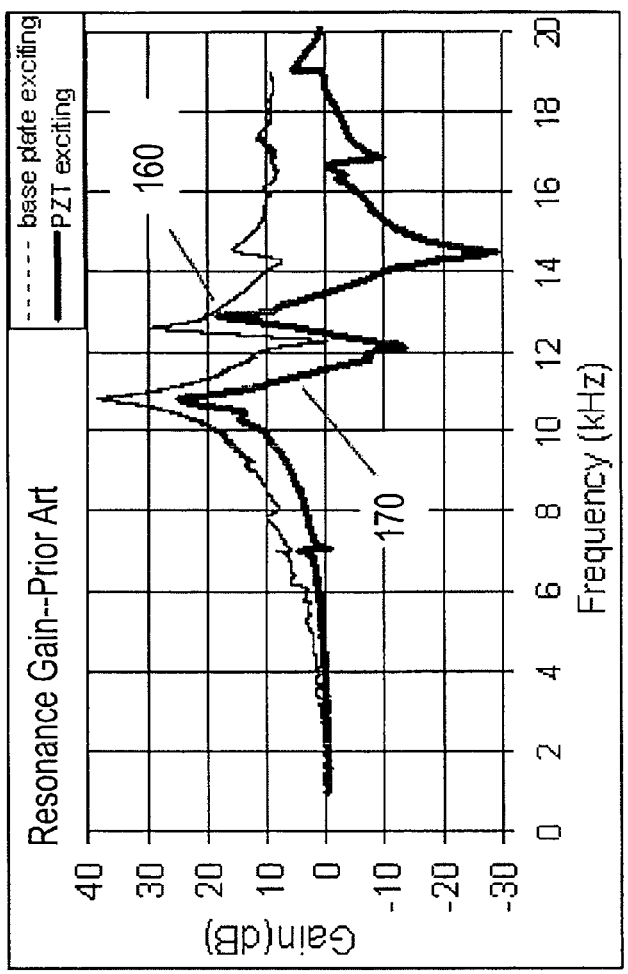
FIG. 6 shows testing data of the resonance of a prior PZT micro-actuator design.
Figure 5:
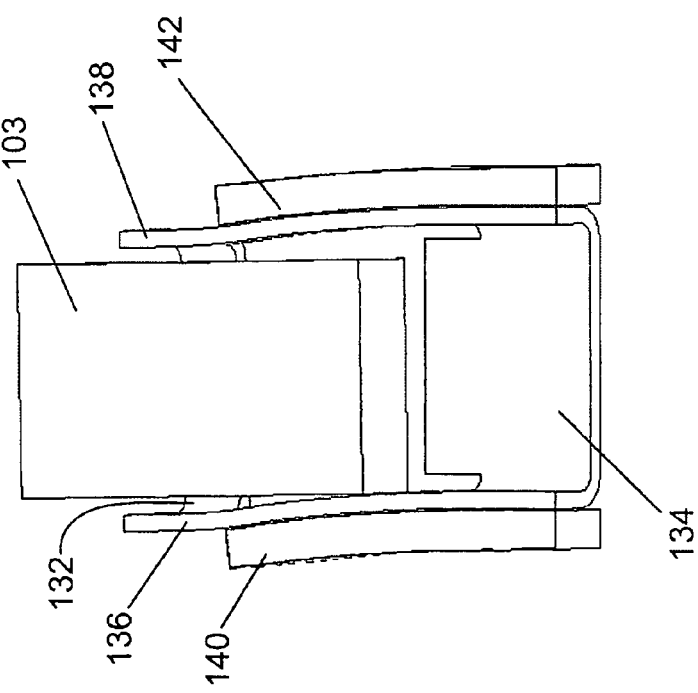
FIG. 5 is a top view of the slider and PZT micro-actuator of the HGA shown in FIG. 2 in use.
Figure 17:
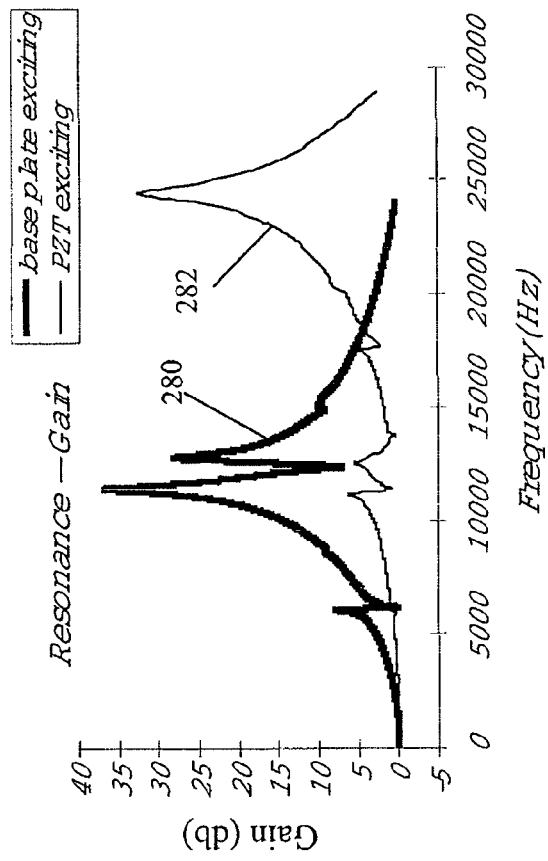
FIG. 17 shows testing data of the resonance gain of the PZT micro-actuator shown in FIG. 7.
Figure 18:
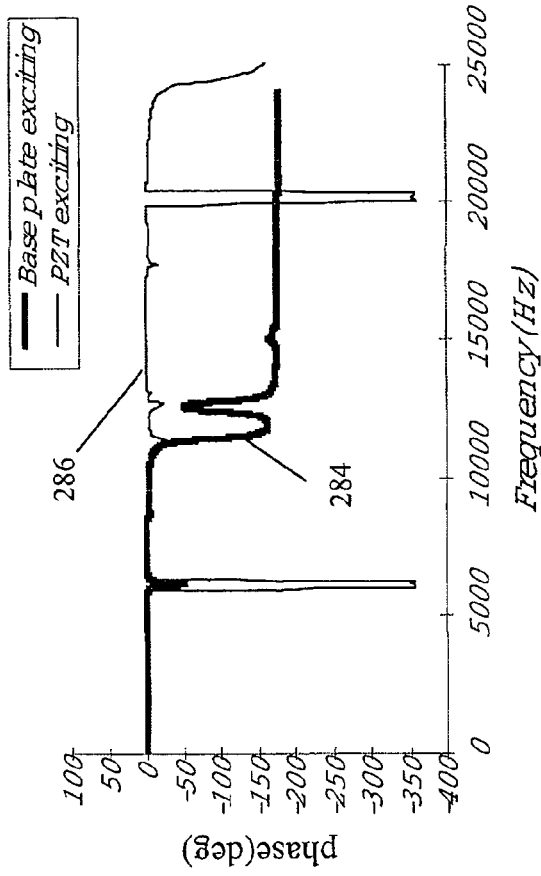
FIG. 18 shows testing data of the resonance phase of the PZT micro-actuator shown in FIG. 7.

FIGS. 17 and 18 illustrate resonance testing data of the PZT micro-actuator 212. FIG. 17 illustrates a resonance gain and FIG. 18 illustrates a resonance phase. As illustrated, the curves 280 and 284 illustrate the resonance gain and phase when the suspension base plate is shaken or excited, and the curves 282 and 286 illustrate the resonance gain and phase when the PZT elements 242, 243 of the PZT micro-actuator 212 are excited. Since the PZT micro-actuator 212 works as a rotation-type rather than a prior sway-type, a relatively small reaction force is applied to the suspension when the PZT micro-actuator 212 is operated. That is, the PZT micro-actuator 212 does not have a suspension resonance model like the prior model represented in FIG. 6. Thus, the PZT micro-actuator 212 greatly improves the performance characteristics of the disk drive device and a high bandwidth of the servo may be achieved.

FIGS. 19 and 20a-20h illustrate the primary steps involved in the manufacturing and assembly process of the PZT micro-actuator 212 according to an embodiment of the present invention. After the process starts (step 201 in FIG. 19), a sheet 290 including multiple rows 292, e.g., row bars, of interconnected frame units 294 is formed, e.g., by etching (step 202 in FIG. 19), as shown in FIG. 20a. In the illustrated embodiment, the sheet 290 includes four interconnected rows 292, with each row 292 including three interconnected frame units 294. However, the sheet 290 may include other suitable numbers of rows 292 and frame units 294. Also, in the illustrated embodiment, each of the frame units 294 will be formed into a frame of the type described above in FIGS. 7-13.

Figure 19:
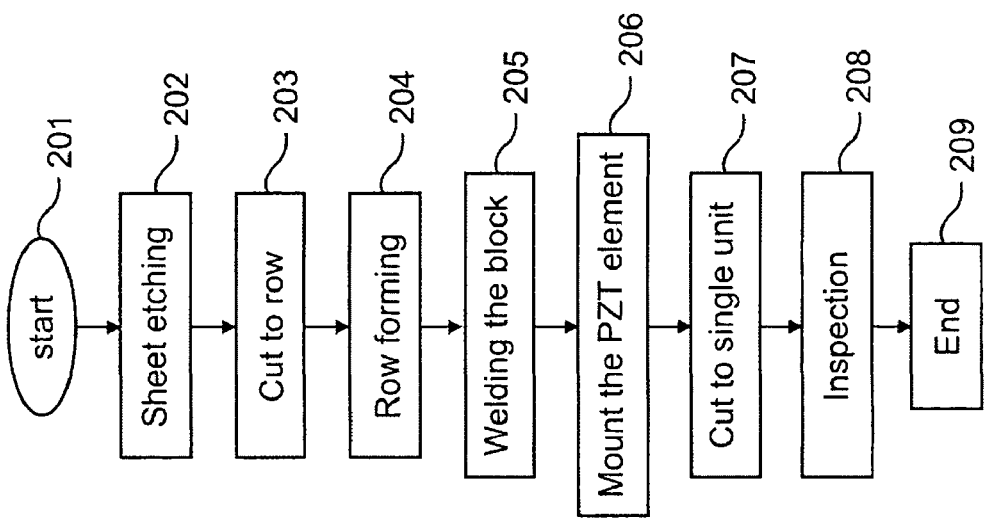
FIG. 19 is a flow chart illustrating a manufacturing process according to an embodiment of the present invention.

Next, as shown in FIG. 20b, a single row bar 292 is cut from the sheet 290 (step 203 in FIG. 19). Then, the sides of the row bar 292 are bent to form side arms 258, 259 for each frame unit 294 (step 204 in FIG. 19), as shown in FIG. 20c.

As shown in FIGS. 20d and 20e, a block 254 is mounted, e.g., by welding, between the side arms 258, 259 of each frame unit 294 (step 205 in FIG. 19). The block 254 is of the type described above in FIGS. 7-13. After that, PZT elements 242, 243 are mounted to respective side arms 258, 259 of each frame unit 294 (step 206 in FIG. 19), as shown in FIGS. 20f and 20g. The PZT elements 242, 243 are of the type described above in FIGS. 7-13.

After mounting the blocks 254 and PZT elements 242, 243 to respective frame units 294 of the row bar 292, a single frame unit 294 is cut from the row bar 292 to form a PZT micro-actuator 212 (step 207 in FIG. 19), as shown in FIG. 20h. Finally, the PZT micro-actuator 212 is inspected (step 208 in FIG. 19) to complete the manufacturing and assembly process (step 209 in FIG. 19).

Figure 21:
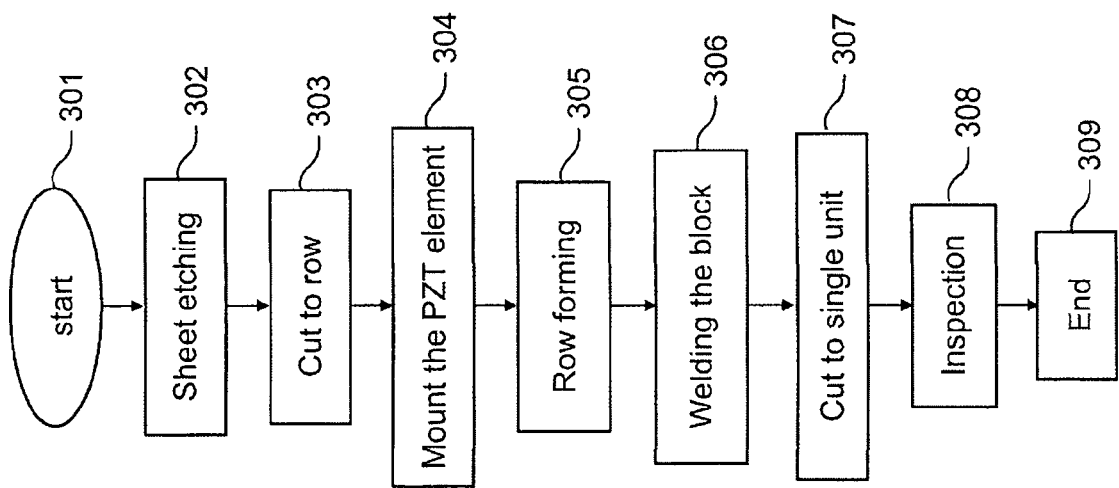
FIG. 21 is a flow chart illustrating a manufacturing process according to another embodiment of the present invention.
Figure 22B:
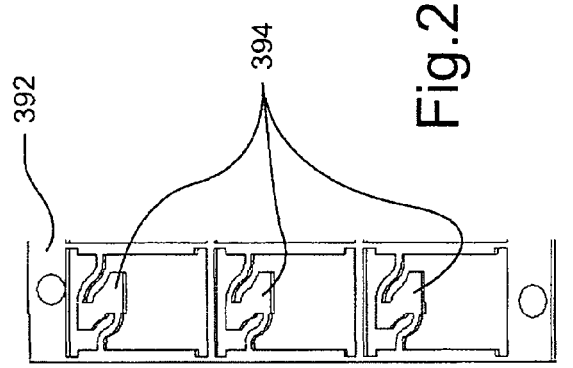
Figure 22D:
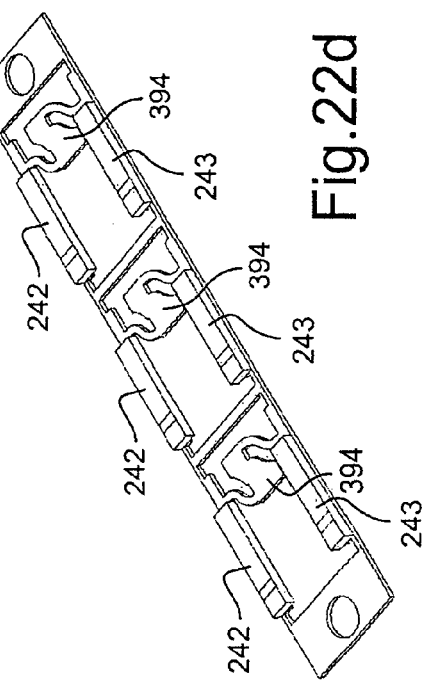
Figure 22A:
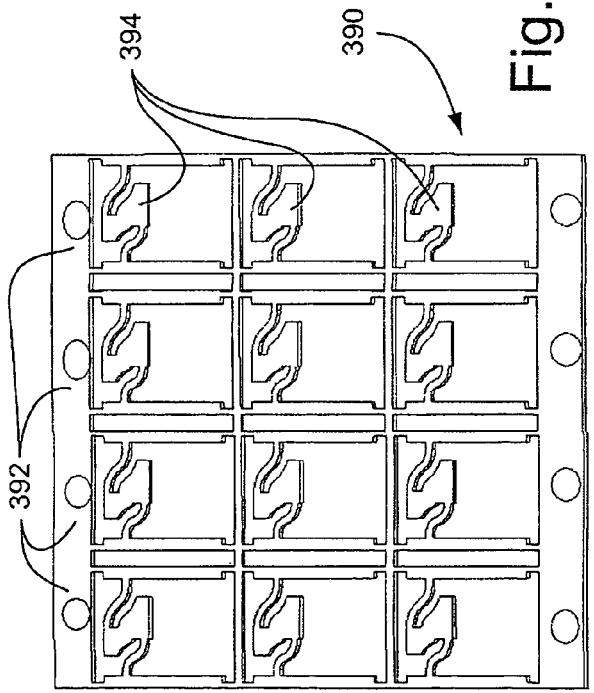

FIGS. 21 and 22a-22h illustrate the primary steps involved in the manufacturing and assembly process of the PZT micro-actuator 212 according to another embodiment of the present invention. After the process starts (step 301 in FIG. 21), a sheet 390 including multiple rows 392, e.g., row bars, of interconnected frame units 394 is formed, e.g., by etching (step 302 in FIG. 21), as shown in FIG. 22a. In the illustrated embodiment, the sheet 390 includes four interconnected rows 392, with each row 392 including three interconnected frame units 394. However, the sheet 390 may include other suitable numbers of rows 392 and frame units 394. Also, in the illustrated embodiment, each of the frame units 394 will be formed into a frame of the type described above in FIGS. 7-13.

Figure 22C:
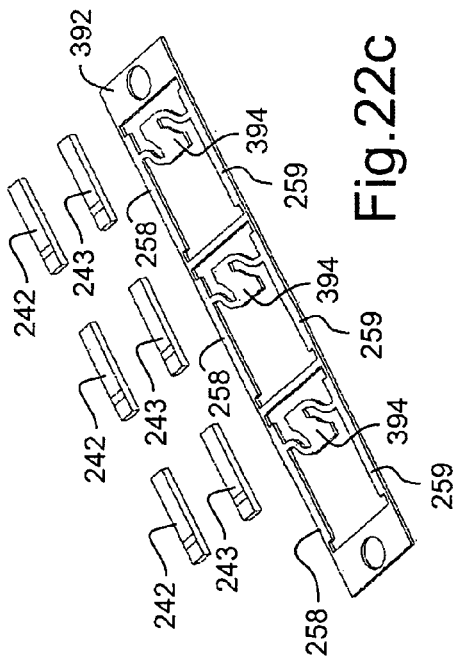

Next, as shown in FIG. 22b, a single row bar 392 is cut from the sheet 390 (step 303 in FIG. 21). Then, PZT elements 242, 243 are mounted to respective side arms 258, 259 of each frame unit 394 (step 304 in FIG. 21), as shown in FIGS. 22c and 22d. The PZT elements 242, 243 are of the type described above in FIGS. 7-13.

As shown in FIG. 22e, the sides of the row bar 392 are bent to form upstanding side arms 258, 259 for each frame unit 394 (step 305 in FIG. 21). After that, a block 254 is mounted, e.g., by welding, between the side arms 258, 259 of each frame unit 394 (step 306 in FIG. 21), as shown in FIGS. 22f and 22g. The block 254 is of the type described above in FIGS. 7-13.

After mounting the blocks 254 to respective frame units 394 of the row bar 392, a single frame unit 394 is cut from the row bar 392 to form a PZT micro-actuator 212 (step 307 in FIG. 21), as shown in FIG. 22h. Finally, the PZT micro-actuator 212 is inspected (step 308 in FIG. 21) to complete the manufacturing and assembly process (step 309 in FIG. 21).

Figure 23:
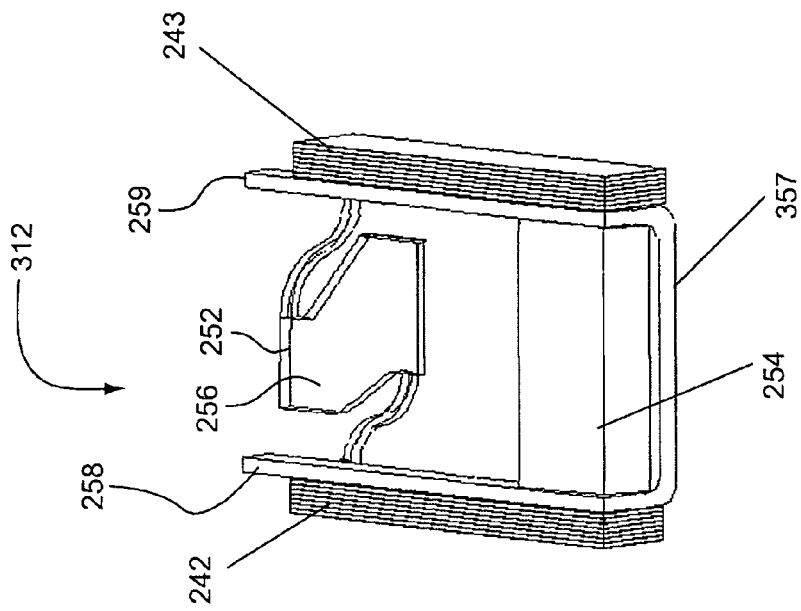
FIG. 23 is an exploded view of a PZT micro-actuator according to another embodiment of the present invention.
Figure 24:
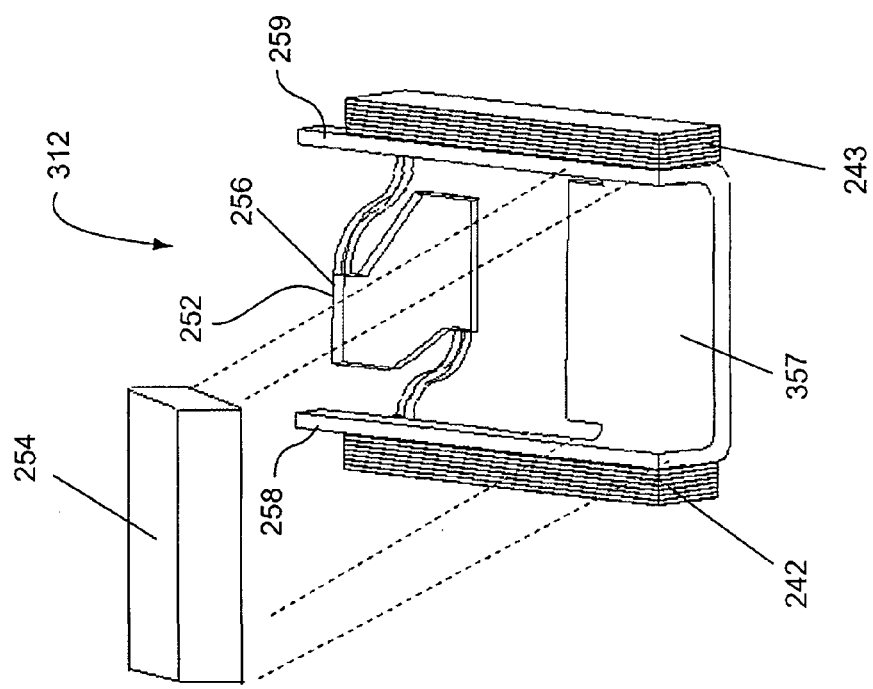
FIG. 24 is an assembled perspective view of the PZT micro-actuator shown in FIG. 23.

FIGS. 23 and 24 illustrate a PZT micro-actuator 312 according to another exemplary embodiment of the present invention. In this embodiment, the frame 252 includes a bottom support or plate 357 to couple the side arms 258, 259. As illustrated, the side arms 258, 259 are vertically formed from opposing sides of the top and bottom supports 256, 357. The block 254 is mounted between the side arms 258, 259 and may be supported by the bottom support 357. The remaining components of the PZT micro-actuator 312 are substantially similar to the PZT micro-actuator 212 and indicated with similar reference numerals. Although structurally different, the PZT micro-actuator 312 has a substantially similar work principle as the PZT micro-actuator 212.

Figure 25:
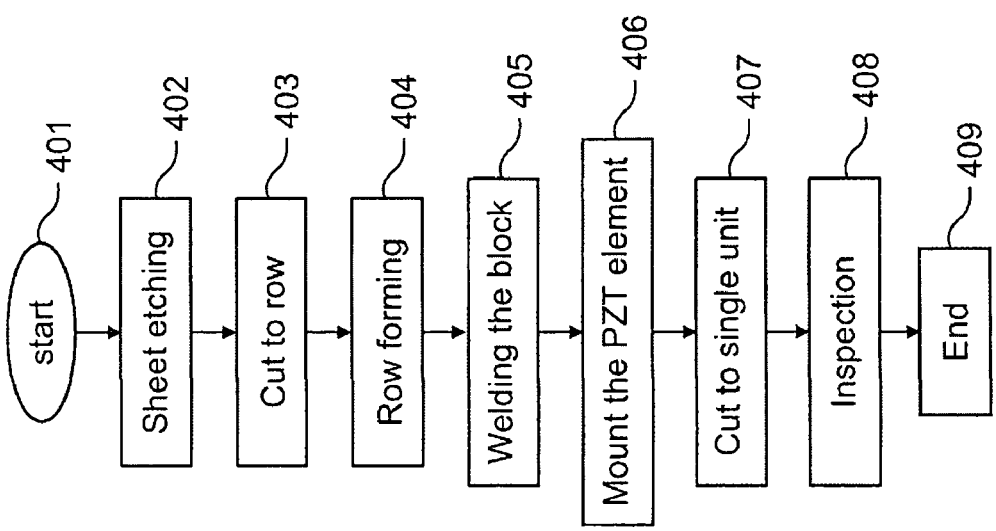
FIG. 25 is a flow chart illustrating a manufacturing process according to another embodiment of the present invention.
Figure 26A:
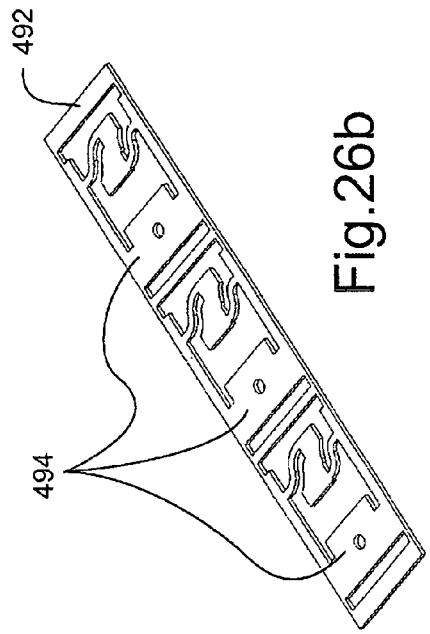

FIGS. 25 and 26a-26h illustrate the primary steps involved in the manufacturing and assembly process of the PZT micro-actuator 312 according to an embodiment of the present invention. After the process starts (step 401 in FIG. 25), a sheet 490 including multiple rows 492, e.g., row bars, of interconnected frame units 494 is formed, e.g., by etching (step 402 in FIG. 25), as shown in FIG. 26a. In the illustrated embodiment, the sheet 490 includes four interconnected rows 492, with each row 492 including three interconnected frame units 494. However, the sheet 490 may include other suitable numbers of rows 492 and frame units 494. Also, in the illustrated embodiment, each of the frame units 494 will be formed into a frame of the type described above in FIGS. 23-24.

Figure 26B:
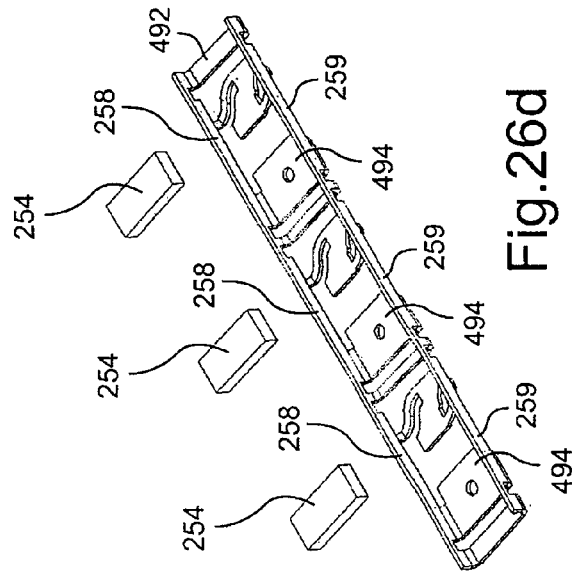
Figure 26C:
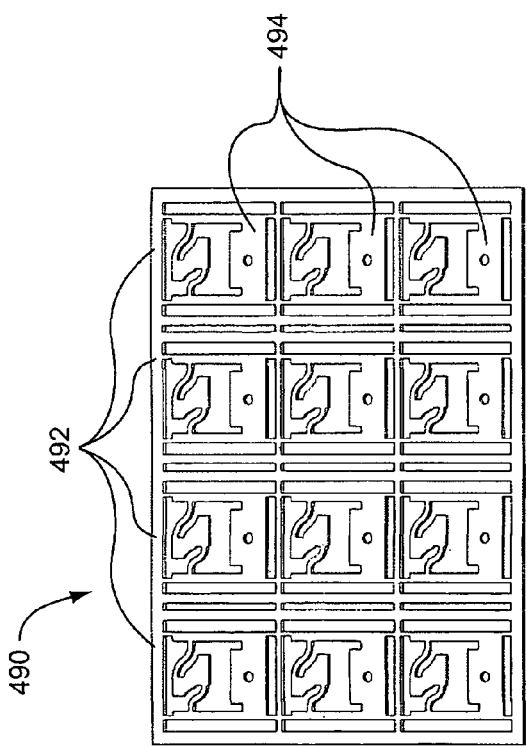

Next, as shown in FIG. 26b, a single row bar 492 is cut from the sheet 490 (step 403 in FIG. 25). Then, the sides of the row bar 492 are bent to form side arms 258, 259 for each frame unit 494 (step 404 in FIG. 25), as shown in FIG. 26c.

Figure 26D:
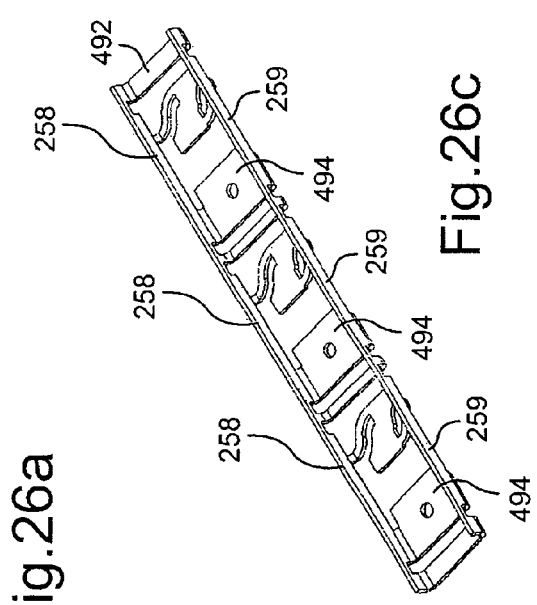

As shown in FIGS. 26d and 26e, a block 254 is mounted, e.g., by welding, between the side arms 258, 259 of each frame unit 494 (step 405 in FIG. 25). The block 254 is of the type described above in FIGS. 7-13. After that, PZT elements 242, 243 are mounted to respective side arms 258, 259 of each frame unit 494 (step 406 in FIG. 25), as shown in FIGS. 26f and 26g. The PZT elements 242, 243 are of the type described above in FIGS. 7-13.

After mounting the blocks 254 and PZT elements 242, 243 to respective frame units 494 of the row bar 492, a single frame unit 494 is cut from the row bar 492 to form a PZT micro-actuator 312 (step 407 in FIG. 25), as shown in FIG.

26*h*. Finally, the PZT micro-actuator 312 is inspected (step 408 in FIG. 25) to complete the manufacturing and assembly process (step 409 in FIG. 25).

A head gimbal assembly 210 incorporating a PZT micro-actuator 212, 312 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator. In an embodiment, the PZT micro-actuator is used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
a metal frame including
a top support adapted to support a slider of the head gimbal assembly, and
a pair of side arms extending perpendicularly from respective sides of the top support,
the top support including a rotatable plate and connection arms that couple the rotatable plate to respective side arms;
a PZT element mounted to each of the side arms, each PZT element being excitable to cause the side arms to bend in opposite directions; and
a rigid beam mounted between the side arms at an end opposite the top support and adapted to connect the metal frame to a suspension of the head gimbal assembly.

2. The micro-actuator according to claim 1, wherein the connection arms of the top support have a curved configuration.

3. The micro-actuator according to claim 2, wherein the connection arms are coupled with respective side arms, and the distances between the coupling points and the ends of the respective side arms opposite the top support are the same.

4. The micro-actuator according to claim 2, wherein the connection arms are coupled with the rotatable plate in mirror relation to a center of the rotatable plate.

5. The micro-actuator according to claim 1, wherein each PZT element is a ceramic PZT or a thin-film PZT, or PMN-PT.

6. The micro-actuator according to claim 1, wherein the PZT elements have the same polarizations.

7. The micro-actuator according to claim 1, wherein the rigid beam provides a step to a side of the metal frame.

8. The micro-actuator according to claim 7, wherein the step is in the range of 35-70 μm.

9. The micro-actuator according to claim 1, further comprising a bottom support that extends between the side arms.

10. The micro-actuator according to claim 1, wherein the PZT elements have different polarizations.

11. A disk drive device comprising:
a head gimbal assembly including a micro-actuator, a slider, and a suspension that supports the micro-actuator and slider;
a drive arm connected to the head gimbal assembly;
a disk; and
a spindle motor operable to spin the disk,
wherein the micro-actuator includes:
a metal frame including
a top support adapted to support the slider, and
a pair of side arms extending perpendicularly from respective sides of the top support,
the top support including a rotatable plate and connection arms that couple the rotatable plate to respective side arms;
a PZT element mounted to each of the side arms, each PZT element being excitable to cause the side arms to bend in opposite directions; and
a rigid beam mounted between the side arms at an end opposite the top support and connecting the metal frame to a suspension of the head gimbal assembly.

12. A head gimbal assembly comprising:
a micro-actuator;
a slider; and
a suspension that supports the micro-actuator and the slider,
wherein the micro-actuator includes:
a metal frame including
a top support adapted to support the slider, and
a pair of side arms extending perpendicularly from respective sides of the top support,
the top support including a rotatable plate and connection arms that couple the rotatable plate to respective side arms;
a PZT element mounted to each of the side arms, each PZT element being excitable to cause the side arms to bend in opposite directions; and
a rigid beam mounted between the side arms at an end opposite the top support and connecting the metal frame to a suspension of the head gimbal assembly.

13. The head gimbal assembly according to claim 12, wherein the slider includes a read/write element for magnetic recording.

14. The head gimbal assembly according to claim 12, wherein the connection arms of the top support have a curved configuration.

15. The head gimbal assembly according to claim 14, wherein the connection arms are coupled with respective side arms, and the distances between the coupling points and the ends of the respective side arms opposite the top support are the same.

16. The head gimbal assembly according to 14, wherein the connection arms are coupled with the rotatable plate in mirror relation to a center of the rotatable plate.

17. The head gimbal assembly according to claim 12, wherein each PZT element is a ceramic PZT or a thin-film PZT.

18. The head gimbal assembly according to claim 12, wherein the PZT elements have the same polarizations.

19. The head gimbal assembly according to claim 12, wherein the rigid beam provides a step to a side of the metal frame.

20. The head gimbal assembly according to claim 19, wherein the step is in the range of 35-70 μm.

21. The head gimbal assembly according to claim 12, further comprising a bottom support that extends between the side arms.

22. The head gimbal assembly according to claim 12, wherein the PZT elements have different polarizations.

* * * * *